United States Patent Office 3,512,063
Patented May 12, 1970

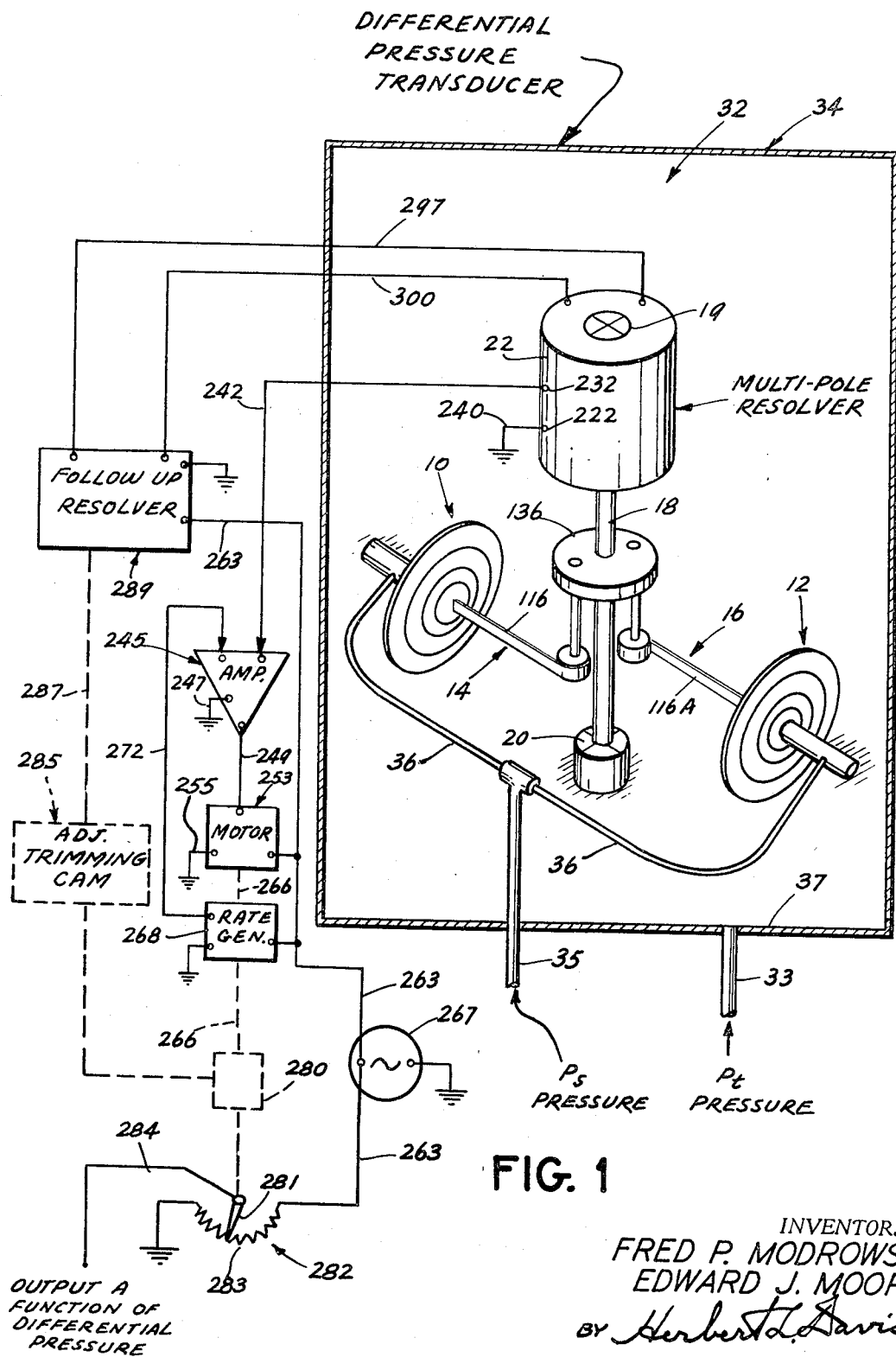

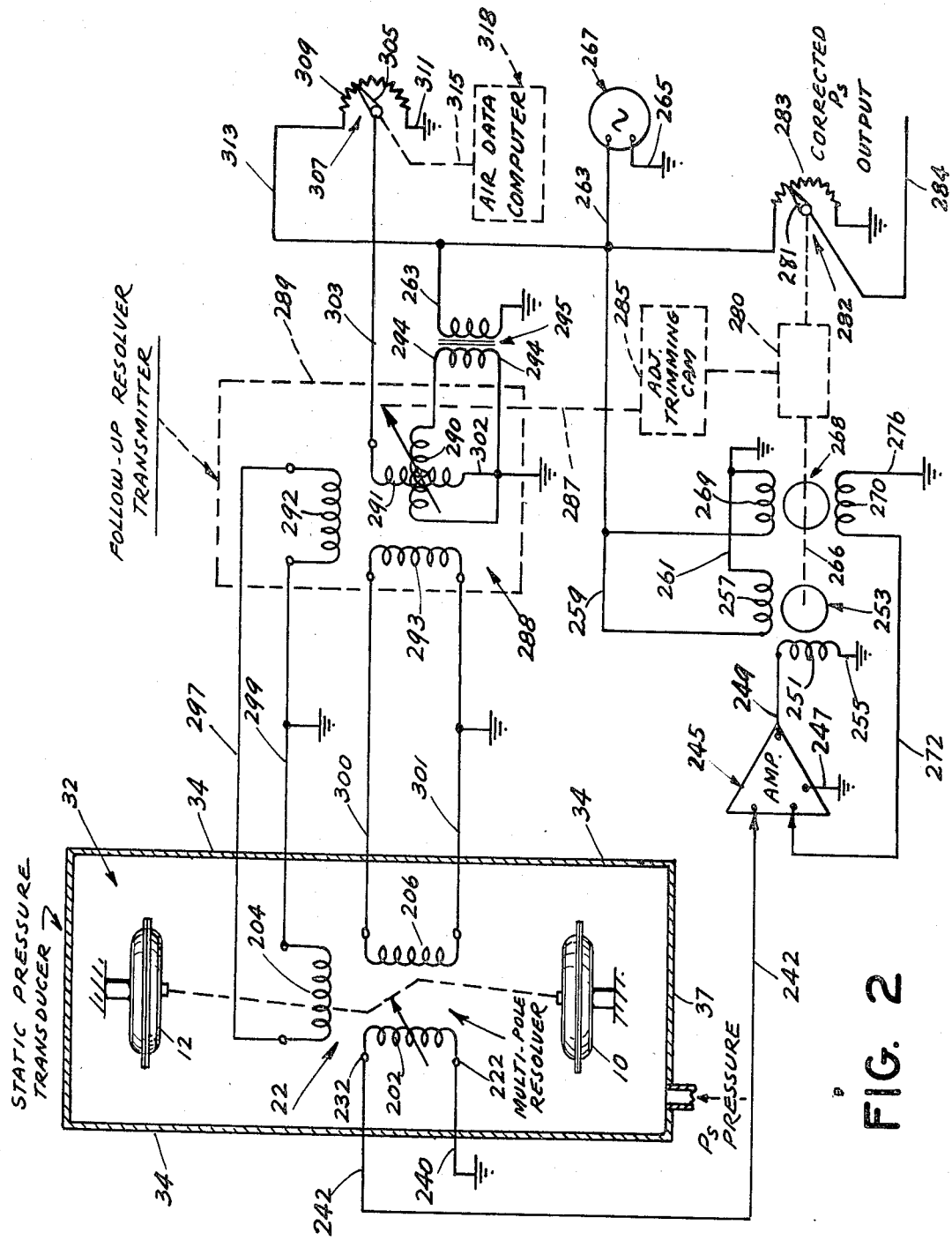

3,512,063
POSITION SERVOMECHANISM INCLUDING A UNIQUE RESOLVER NETWORK
Fred P. Modrowsky, Union, and Edward J. Moore, Paterson, N.J., assignors to The Bendix Corporation, a corporation of Delaware
Original application July 12, 1966, Ser. No. 564,571. Divided and this application Sept. 27, 1968, Ser. No. 763,229
Int. Cl. G05b 11/12
U.S. Cl. 318—18
10 Claims

ABSTRACT OF THE DISCLOSURE

A position control servomechanism involving an improved inductive coupling arrangement in which outputs of a single speed resolver are fed into input windings of a multi-speed resolver so as to provide output signals for controlling a servomotor so as to provide at an output shaft of the motor an adjusted angular position to effect a control function and which angular adjusted position of the output shaft corresponds to an effective amplification of an angular position of an atmospheric pressure responsive control device for operating the multi-speed resolver over a predetermined limited arcuate range, while an alternating current source applied to an input winding of the single speed resolver may be effectively varied to correct the effective amplification and thereby the angular adjusted position of the output shaft of the motor in accordance with the prevailing airspeed of an aircraft carrying the atmospheric pressure responsive control device.

CROSS-REFERENCE TO RELATED APPLICATION

The present application is a division of a copending U.S. application Ser. No. 564,571, filed July 12, 1966, by Fred P. Modrowsky and Edward P. Moore, for a Fluid Pressure Sensing Mechanism Operatively Arranged to Compensate for Changing Environmental Conditions, now U.S. Patent No. 3,444,735, granted May 20, 1969, and assigned to The Bendix Corporation, assignee of the present invention.

The present invention is directed to a position control servomechanism which may be embodied in a fluid pressure sensing mechanism of a type such as described and claimed in the aforenoted U.S. Pat. No. 3,444,735 and includes means operable through the position control servomechanism to provide an electromechanical amplification at an output shaft of an angular adjusted position of a fluid pressure device over a predetermined limited arcuate range as well as providing air speed responsive means for varying energization of the servomechanism for effecting a correction in the amplified angular position of the output shaft.

BACKGROUND OF THE INVENTION

Field of the invention

The invention is in the field of position control servomechanisms and more particularly in an improved inductive coupling arrangement in such servomechanisms.

Description of the prior art

The present invention involves distinct improvements in the structure and mode of operation of the pressure sensing mechanism and position control servomechanism described and claimed in U.S. Pat. No. 3,165,682, granted Jan. 12, 1965, to Fred P. Modrowsky and Harry G. Anastasia, and assigned to The Bendix Corporation, the assignee of the present invention. In order to increase the design simplicity of the pressure sensing mechanism, there is provided in the present invention an improved inductive coupling arrangement which was substituted in place of the dynamic seal and involved mechanical feedback of the Modrowsky et al. U.S. Pat. No. 3,165,-682. Further, in improving the transducer repeatability and reliability characteristics of the present invention there was substituted the flexural pivots 19 and 20 in the device of the present invention in place of the jewel bearings of the Modrowsky et al. patent, and the tapes 116 and 116A for the linkages and much more complex structure of the Modrowsky et al. patent. The improved structure, however, had a limited range of arcuate movement and to provide a desirable amplification at a servomotor output shaft, there is provided a multi-pole resolver coupling 22, as shown herein by FIGS. 1 and 2, in place of the electrical pick-off and involved follow up and differential bearing of the Modrowsky et al. patent.

The invention further relates to a fluid pressure sensing mechanism in which there is provided an improved position control servomechanism operatively arranged to compensate for changing environmental conditions and, more particularly, to a pressure sensing device of simplified design capable of providing repeatable output signals of extreme accuracy and involving an improved position control servomechanism over that of prior devices, such as disclosed and claimed in U.S. Pat. No. 3,165,682, granted Jan. 12, 1965, to Fred P. Modrowsky and Harry G. Anastasia, and in U.S. Pat. No. 3,132,315, granted May 5, 1964, to F. Henry S. Rossire, both patents being assigned to The Bendix Corporation.

Moreover, there have been noted of interest U.S. Pat. No. 3,299,701, granted Jan. 24, 1967, to Theodore C. Scarlett, and U.S. Pat. No. 2,869,367, granted Jan. 20, 1959, to David W. Moore, as showing generally somewhat analogous pressure measuring devices, while U.S. Pat. No. 2,976,467, granted Mar. 21, 1961, to Rawley D. McCoy, discloses a concept of a single speed follow up resolver operated by a servomotor and having output windings applying electrical output signals into input windings of a multi-speed resolver to eliminate ambiguity in the angular position to which an output shaft positioned by the servomotor controlled by the multi-speed resolver may be set with respect to a given position of an input shaft controlling the multi-speed resolver.

Such prior art, however, fails to suggest the simplified arrangement of the position control servomechanism of the present invention as applied to solve the particular problem here involved in which a rotor of the multi-speed resolver may be angularly positioned only over a predetermined limited arcuate range by an atmospheric pressure responsive control device so as to required in order to effect a desired control function an angular adjusted position of an output shaft operated by the servomotor corresponding to an amplification of the angular adjusted position of the rotor of the multi-speed resolver effected over the predetermined limited arcuate range by the atmospheric pressure responsive control device, the amplification ratio being dependent upon the number of poles of the multi-speed resolver to the number of poles of the single speed resolver; nor does the prior art suggest the idea of means in the present invention to vary the energization of the single speed resolver from a source of alternating current so as to effect a correction in such amplification and thereby in the angular adjusted position of the output shaft as provided in the present invention, particularly in the provision of an airspeed responsive means for operating the variable means so as to effect the correction in accordance with the prevailing airspeed of an aircraft carrying the atmospheric pressure responsive control device.

SUMMARY OF THE INVENTION

The invention contemplates an improved position control servomechanism responsive to a pressure transducer and which position control mechanism may be corrected for changes in environmental conditions and which is of extreme simplicity in operational design and arrangement.

An object of the invention is to provide in a pressure sensing mechanism movable over a predetermined limited arcuate range a position control servomechanism including a multi-pole resolver or control transformer operable by the pressure sensing mechanism and having a number of poles equal to a multiple of the number of poles of an electrically connected follow-up resolver, operable by the servomotor so that for example, the control transformer may be of a conventional four-pole resolver type while the follow-up resolver may be of a conventional two-pole resolver type so as to in effect provide a mechanical amplification or an effective electrical gearing in transmitting the limited arcuate range of movement of the pressure sensing mechanism through a servo-motor system controlled thereby in which the follow-up resolver shaft is required to be driven by the servo motor twice the mechanical angle of adjustment of the rotor of the four-pole resolver in order to null the controlling signal effected by the pressure responsive control or multipole resolver.

Another object of the invention is to provide in such a pressure sensing mechanism a pressure sensing transducer which is electrically coupled to the follow-up transducer while being mechanically isolated from the follow-up transducer so as to provide for greater accuracy of control in avoiding the use of a mechanical follow-up shaft and gearing as in the case of the pressure sensing mechanism disclosed in the foregoing U.S. Pat. No. 3,165,682.

Another object of the invention is to provide a pressure transducer in which a sensed pressure may effectively vary with a prevailing condition, and means responsive to the prevailing condition to correct through electrical control of the servomechanism for an error in the sensed pressure in response to the prevailing condition so as to provide a corrected electrical output signal corresponding to the prevailing pressure.

Another object of the invention is to provide in an aircraft a static source error correction means to shift a sensed static pressure signal as a function of a computed Mach number at the prevailing airspeed of the aircraft so as to provide a corrected signal corresponding to the true ambient atmospheric pressure effective at the aircraft.

These and other objects and features of the invention are pointed out in the following description in terms of the embodiments thereof which are shown in the accompanying drawings.

DESCRIPTION OF THE DRAWINGS

FIG. 1 is a diagrammatic perspective view of a position control servomechanism embodying the present invention and responsive to a differential pressure transducer.

FIG. 2 is a schematic wiring diagram illustrating the operation of a position control servomechanism embodying the present invention and responsive to an ambient atmospheric pressure transducer and a means responsive to the prevailing airspeed of an aircraft carrying the pressure transducer to effect a correction in the angular position of an output shaft driven by the servomechanism.

DESCRIPTION OF THE INVENTION

Referring to the drawings of FIG. 1, the fluid pressure sensing mechanism is shown as including a pair of diaphragm capsules 10 and 12 operatively connected by tape linkages 14 and 16 to a shaft 18 as shown in the copending parent U.S. application Ser. No. 564,571. The shaft 18 is pivotally supported by flexural pivot elements 19 and 20 which may be of a type described and claimed in U.S. Pat. No. 3,073,584 granted Jan. 15, 1963 to Henry Troeger and assigned to The Bendix Corporation. The shaft 18 is in turn connected to a rotor element of a multi-speed or multi-pole resolver transformer 22.

The aforenoted elements are mounted within a chamber 32 enclosed by a sealed casing 34 shown in FIG. 1. The sealed casing 34 has a fluid pressure medium applied therein through a pressure conduit or tube 33 opening through a mounting plate 37 into the chamber 32 and leading from a source of fluid pressure medium such as the impact or total pressure $P_t$ applied through a pressure probe, which may be of a conventional type such as heretofore utilized on aircraft. The static or ambient atmospheric pressure may be applied through tubes 35 and 36 to the interior of the diaphragm capsules 10 and 12, as shown in FIG. 1.

The static pressure transducer shown in the schematic wiring diagram of FIG. 2 may be of a similar structure to that of the fluid pressure sensing mechanism of FIG. 1, except that the static pressure conduits or tubes 35 and 36 of FIG. 1 may not be utilized in the static pressure transducer of FIG. 2. In FIG. 2 the capsules 10 and 12 may be sealed or evacuated so that the ambient atmospheric or static pressure $P_S$ may be applied through the conduit 33 to the interior of the chamber 32 to thereby cause the pressure $P_S$ to be applied to the outer surfaces of the evacuated diaphragm capsules 10 and 12 to effect a controlled contraction and expansion thereof in response to the effective pressure $P_S$. Moreover corresponding numerals in FIGS. 1 and 2 indicate corresponding parts in the respective electrical control networks of the differential pressure transducer of FIG. 1 and the static pressure transducer of FIG. 2.

As shown diagrammatically in FIG. 2, the rotor winding 202 may be connected through the output conductors 222 and 232 to a grounded conductor 240 and a conductor 242 leading to an input of an amplifier 245 of conventional type. Amplifier 245 has in addition to the input conductor 242 a grounded input-output conductor 247 and an output lead 249 leading to a control winding 251 of a reversible electrical two phase servo motor 253 of conventional type. The control winding 251 of the two phase servo motor 253 has an opposite grounded conductor 255. A fixed phase winding 257 is connected by conductors 259 and 261 to output leads 263 and 265 from a suitable source of alternating current 267.

The rotor of the motor 253 drives through a shaft 266 a rotor of a rate generator 268 of conventional type having a fixed phase winding 269 connected across a source of alternating current 267 and an output winding 270 connected through a conductor 272 to the input of the amplifier 245 and through a grounded conductor 276 to the grounded input-output terminal 247 of the amplifier 245 so as to apply in a conventional manner an alternating current anti-hunting component to the AC input signal applied across the input conductors 242 and 247 of the amplifier 245.

In the differential pressure transducer of FIG. 1, the motor 253 in response to an output signal from the resolver 22 drives the shaft 266 and through a suitable reduction gearing 280 an adjustable arm 281 of a potentiometer 282 in cooperative relation with a multi-turn resistor 283 having one end connected to ground and an opposite end connected to a conductor 263 so that the resistor 283 is effectively connected across the source of alternating current 267 and the adjusted position of the arm 281 effects at an output conductor 284 an AC electrical signal proportional to the sensed differential pressure or log $P_t - P_S$.

Also driven by the motor 253 through the gearing 280 and an adjustable trimming cam mechanism 285, of conventional type, is a shaft 287 to adjustably position a rotor element of a conventional single speed follow-up resolver indicated in FIG. 2 by the numeral 289. The multi-pole resolver 22 having a number of poles equal to a predetermined multiple of the number of poles of the single speed resolver 289 so as to in effect require a greater angle of rotation of the follow-up resolver 289 than the multi-pole resolver 22 to effect a null.

In the static pressure transducer of FIG. 2 the rotor element 288 of the follow-up resolver 289 may include two phase windings 290 and 291 arranged in inductive coupling relation with two phase stator windings 292 and 293. The rotor winding 290 is connected by conductors 294 across a secondary winding of a transformer 295 having a primary winding connected across the source of alternating current 267 through conductors 263 and 265.

Further, as shown by FIG. 2, the stator winding 292 of the single speed follow-up resolver 289 is connected by conductors 297 and 299 to the stator winding 204 of the static pressure responsive multi-speed or multi-pole resolver 22 of the pressure transducer while the stator winding 293 is connected by conductors 300 and 301 to the stator winding 206 of the multi-pole resolver 22. The motor 253 thus adjusts through the shaft 287 the position of the rotor 288 of the follow-up resolver 289 so as to provide a follow-up signal to the stator winding 204 and 206 of the multi-pole resolver 22 which effects the phase and magnitude of the output signal applied at the conductors 240 and 242 for controlling through the amplifier 245 the reversible electric motor 253.

In the static pressure transducer of FIG. 2, the motor 253 in response to an output signal from the resolver 22 drives the shaft 266 and through a suitable reduction gearing 280 an adjustable arm 281 of a potentiometer 282 in cooperative relation with a multi-turn resistor 283 having one end connected to ground and an opposite end connected to conductor 263 so as to be effectively connected across the source of alternating current 267 to effect at an output conductor 284 an AC signal output proportional to the sensed static pressure or log $P_S$.

Further as shown by FIG. 2, in the control network of the static pressure transducer, the rotor winding 291 of the follow-up resolver 289 is connected by a conductor 302 to the ground conductor 265 leading from the source of alternating current 267 while an opposite terminal of the rotor winding 291 is connected by a conductor 303 to an adjustable arm 305 of a potentiometer 307 cooperatively arranged in relation to a multi-turn resistor 309. The resistor 309 is connected to ground through a conductor 311 and thereby to the grounded terminal of the source of electrical energy 267 while the opposite terminal of the resistor 309 is connected by conductors 313 and 263 to an opposite terminal of the source of electrical energy 267. The arm 305 of the potentiometer 307 may be positioned by the operator to effect an AC voltage to the rotor winding 291 to correct for an error in the sensed pressure.

Moreover, the pressure transducer of FIG. 2 may be utilized in an aircraft to sense under varying speed conditions the atmospheric pressure at the level of flight of the aircraft in which case the arm 305 may be adjustably positioned through a shaft 315 in accordance with the speed or Mach number of the aircraft as computed by a device of conventional type such as an air data computer 318 so as to provide a variable AC voltage to the rotor winding 291 proportional to a predetermined "correction error" in the sensed static pressure. The AC voltage thus applied to the rotor winding 291 serves to correct the signal resulting from the sensed static pressure for an error introduced therein by the prevailing airspeed of the aircraft so that the corrected static pressure signal or Log $P_S$ at the output 284 of the static pressure transducer of FIG. 2 is more accurately proportional to that of the prevailing ambient atmospheric pressure.

As shown diagrammatically in FIG. 1, the bellows 10 and 12 may be differentially effected by the pressures applied through conduits 33 and 35, while as shown schematically in FIG. 2, the bellows 10 anad 12 may be evacuated and arranged to be responsive to ambient atmospheric pressure or other pressure applied through the conduit 33. In the form of the invention, as illustrated in FIG. 1, the conduit 33 may lead from the impact pressure or total pressure $P_t$ provided by a pressure probe of conventional type and applied to the interior of the pressure chamber 32 so that the diaphragm capsules 10 and 12 may be subject at the outer surfaces thereof to the impact pressure $P_t$, while the conduit 35 may open the interior of the diaphragm capsules 10 and 12 to the static or ambient atmospheric pressure $P_S$ so that the capsules 10 and 12 respond in a conventional manner to the difference in the pressures applied thereto by the ambient atmospheric pressure and the impact pressure through the operation of the conventional pressure probe carried by the aircraft in the flight thereof.

Thus, a change in the sensed pressure imparts an arcuate motion to the rotor of the multi-pole resolver 22 through the tape linkage 116 and 116A. Displacement of the rotor creates an error signal of a particular phase, dependent upon which "side" of null the rotor is positioned during the pressure change. A phase sensitive amplifier 245 then in response to the error signal commands a servo motor 253 to drive the arm 281 of a potentiometer 282 and a transmitter resolver 288 to a corresponding follow-up position. Excitation is purposely provided to the input winding of the follow-up resolver 288 to use the transducer servo coupling in a reverse manner to maintain a null voltage on the rotor of the flex-pivot multi-pole resolver.

The multi-pole resolver rotor is mounted between "flex-pivot" bearings 19 and 20 to provide a flexible suspension therefor. The motion of the rotor of the multi-pole resolver 22 is limited over a predetermined arcuate range by the extent of the permissible movement of pins in limit slots, as explained in the copending U.S. application Ser. No. 564,571. The electrical coupling of the multi-pole resolver 22 with the follow-up resolver 288 is so arranged, however, as to provide a mechanical amplification at the output shaft 266 of this limited arcuate movement of the rotor of the multi-pole resolver 22. Thus, the multi-pole resolver 22 has a multiple number of poles to that of the follow-up resolver 288 so that there may be electrically coupled for example a four-pole resolver control transformer 22 with a two-pole resolver transmitter 288 to provide in effect a mechanical amplification of two, i.e. the rotor of the resolver 288 must be rotated twice the mechanical angle imparted to the multi-pole resolver 22 to effectively balance the electrical relationship of the resolvers 22 and 288 in the control network. The relationship of the position of the rotor of the multi-pole resolver 22 to the pneumatic input pressure or pressures sensed by the transducer is established during the calibration thereof.

The operation of the pressure sensing mechanism, is similar for both static pressure and differential pressure sensing. For static pressure operation, the diaphragm capsules 10 and 12 are evacuated and these evacuated aneroid type diaphragm capsules provide the necessary motion to angularly position the rotor of the multi-pole resolver 22 as a function of static pressure $B_S$. In the latter operation, pneumatic static pressure from the aircraft probe enters the sealed chamber 32, as shown diagrammatically in FIG. 2, through tubing 33, and essentially surrounds the diaphragm capsules 10 and 12 to provide the effective operating pressure. The diametrically positioned cells 10 and 12 provide attitude and acceleration isolatory to the transducer's output.

As shown in FIG. 2, an adjustable trimming cam mechanism 285 is used in the servo feedback loop to accurately modify the effects of the basic motions of the diaphragm capsules 10 and 12 so that the controlling signals are within required accuracy tolerances. The output potentiometer 282 of FIG. 2, then provides a voltage output proportional to static pressure. For differential pressure sensing operation, both pneumatic total and static pressures from the aircraft probes are required for operation of the pressure transducer, as shown diagrammatically by FIG. 1. Also, as shown in the diagram of FIG. 1, total pressure is introduced into the sealed chamber 32 so as to surround the diaphragm capsules 10 and 12, while static pressure is applied to the interior of the diaphragm capsule cells 10 and 12 through the conduits 35 and 36. The resulting position then effected by the diaphragm capsules 10 and 12 is proportional to the difference between the $P_t$ and $P_s$ pressures.

Provision is further made in the present invention to provide a pneumatic pressure probe source error correction capability. As shown in the schematic wiring diagram of FIGURE 2, a static pressure source error correction is provided by applying to the 90° input winding 291 of the follow-up resolver 289, an alternating current signal having a voltage proportional to the required correction, which is basically a function of Mach number so that the null of the electrical transducer-servo link will in effect be shifted in proportion to the correction voltage thus provided. The voltage representing the pneumatic probe correction is provided through the operation of the air data computer 318 which may be of a conventional type and includes a suitable means to effect the correction factor which is provided by a "customized" potentiometer 307 in accordance with the prevailing Mach number of the aircraft.

While several embodiments of the invention have been illustrated and described, various changes in the form and relative arrangements of the parts, which will now appear to those skilled in the art may be made without departing from the scope of the invention. Reference is, thus, to be had to the appended claims for a definition of the limits of the invention.

What is claimed is:

1. In a mechanism of a type including a control device, a reversible electric motor to angularly position an output shaft, a first electrical control means angularly positioned by said control device for effecting an electrical output signal of variable phase and magnitude for controlling the reversible electric motor; the improvement comprising a second electrical control means energized from a source of alternating current and angularly positioned by the output shaft driven by said electric motor for effecting a pair of electrical follow-up signals of variable phase and magnitude dependent upon the angular position of the second control means, means for applying each of the pair of electrical follow-up signals to the first electrical control means to so control energization thereof, as to effect the phase and magnitude of the electrical output signal and thereby the angular position of the output shaft driven by the electric motor, and other variable means for applying an alternating current to so energize said second electrical control means as to effect a correction in the angular position of the output shaft driven by the electric motor.

2. The combination defined by claim 1 in which the first electrical control means includes a resolver having a pair of two phase input windings, a single phase output winding inductively coupled to the input windings, and the control device being operably connected so as to angularly position the output winding relative to the input windings; the second electrical control means includes a resolver having a pair of two phase output windings, a pair of two phase input windings, one of said pair of two phase input windings being energized from a constant source of alternating current, the other said pair of two phase input windings being energized from a variable source of alternating current, the pair of two phase input findings being inductively coupled to the pair of two phase output windings, the output shaft driven by the electric motor being operably connected so as to angularly position the pair of two phase input windings relative to the pair of two phase output windings; one of the pair of two phase output windings of the resolver of the second electrical control means being connected in an energizing circuit for one of the pair of two phase input windings of the resolver of the first electrical control means, the other of the pair of two phase output windings of the resolver of the second electrical control means being connected in an energizing circuit for the other of the pair of two phase input windings of the resolver of the first electrical control means; and said other variable means includes means for controlling the variable source of alternating current applied to the other of the pair of two phase input windings so as to effect a correction in the angular position of the output shaft driven by the electric motor in accordance therewith.

3. In a mechanism of a type including a fluid pressure responsive control device, means for applying ambient atmospheric fluid pressure to the control device, a reversible electric motor to angularly position an output shaft, a first electrical control means angularly positioned by said control device for effecting an electrical output signal of variable phase and magnitude for controlling the reversible electric motor; the improvement comprising a second electrical control means energized from a source of alternating current and angularly positioned by the output shaft driven by said electric motor for effecting a plurality of electrical follow up signals of variable phase and magnitude dependent upon the angular position of the second control means, means for applying the plurality of electrical follow-up signals to the first electrical control means to so control energization thereof as to effect the phase and magnitude of the electrical output signal and thereby the angular position of the output shaft driven by the electric motor, other variable means for applying an alternating current to so energize said second electrical control means as to effect a correction in the angular position of the output shaft driven by the electric motor, and airspeed responsive means for operating said other variable means so as to cause the correction in the angular position of the output shaft to be effected in accordance with prevailing airspeed of an aircraft carrying the fluid pressure responsive control device.

4. The combination defined by claim 3 in which the first electrical control means includes a multi-speed resolver having a predetermined number of poles, and the second electrical control means includes a single speed resolver having a predetermined number of poles; the multi-speed resolver including a pair of two phase input windings, a single phase output winding inductively coupled to the input windings, and the fluid pressure responsive control device being operably connected so as to angularly position the output winding relative to the input windings of the multi-speed resolver; the single speed resolver including a pair of two phase output windings, a single phase input winding energized from a source of alternating current and inductively coupled to the pair of two phase output windings, and the output shaft driven by the electric motor being operably connected so as to angularly position the input winding relative to the pair of output windings; one of the two phase output windings of the single speed resolver being connected in an energizing circuit for one of the pair of two phase input windings of the multi-speed resolver, and the other of the pair of two phase output windings of the single speed resolver being connected in an energizing circuit for the other of the pair of two phase input windings of the multi-speed resolver; the multi-speed resolver including a number of poles equivalent to a predetermined multiple of the number of poles of the single speed resolver, the angular movement of the input winding of the single speed resolver relative to the pair of two phase output windings required to null the signal at the electrical output of the output winding of the multi-speed resolver being dependent upon the ratio of the number of poles of the multi-speed resolver to the number of poles of the single speed resolver so that the angular position of the input winding of the single speed resolver effected by the output shaft driven by the electric motor may provide an electromechanical amplification of the angular movement imparted to the output winding of the multi-speed resolver in response to changes in the fluid pressure applied to said control device.

5. The combination defined by claim 3 in which the first electrical control means includes a multi-speed resolver having a predetermined number of poles, and the second electrical control means includes a single speed resolver having a predetermined number of poles, the multi-speed resolver including a pair of two phase input windings, a single phase output winding inductively coupled to the input windings, and the fluid pressure responsive control device being operably connected so as to angularly position the output winding relative to the input windings; the single speed resolver including a pair of two phase output windings, a pair of two phase input windings inductively coupled to the pair of two phase output windings, one of the pair of the two phase input windings being energized from a constant source of alternating current, and the other of the pair of two phase input windings being energized from a variable source of alternating current, and the output shaft driven by the electric motor being operably connected so as to angularly position the pair of two phase input windings relative to the pair of two phase output windings; one of the two phase output windings of the single speed resolver being connected in an energizing circuit for one of the pair of two phase input windings of the multi-speed resolver, and the other of the pair of two phase output windings of the single speed resolver being connected in an energizing circuit for the other of the pair of two phase input windings of the multi-speed resolver, the multi-speed resolver including a number of poles equivalent to a predetermined multiple of the number of poles of the single speed resolver, the angular movement of the pair of two phase input windings of the single speed resolver relative to the pair of two phase output windings required to null the signal of the electrical output of the output winding of the multi-speed resolver being dependent upon the ratio of the number of poles of the multi-speed resolver to the number of poles of the single speed resolver so that the angular position of the input windings of the single speed resolver effected by the output shaft driven by the electric motor may effect an electromechanical amplification of the angular movement imparted to the output winding of the multi-speed resolver in response to changes in the fluid pressure applied to said control device, and the variable source of alternating current for energizing the other of the pair of two phase input windings of the single speed resolver including operable means for controlling the phase and magnitude of the energization of said other input winding of the single speed resolver so as to effect a corrective adjustment to the output shaft driven by said electric motor.

6. The combination defined by claim 5 including means for applying ambient atmospheric fluid pressure to the control device, and airspeed responsive means for operating the means for controlling the phase and magnitude of the energization of said other input winding of the single speed resolver so as to effect a correction in the angular position of the output shaft driven by the electric motor in accordance with the prevailing airspeed of an aircraft carrying the fluid pressure responsive control device.

7. In combination an atmospheric pressure responsive control device, a reversible electric motor to angularly position an output shaft to effect a control function, a first electrical control means including a multi-speed resolver having a rotor angularly positioned by the fluid pressure responsive control device and a predetermined number of poles, the rotor of the multi-speed resolver being angularly positioned by the control device over a predetermined limited arcuate range to cause the multi-speed resolver to effect an electrical output signal of variable phase and magnitude for controlling the reversible electric motor, a second electrical control means energized by a source of alternating current, the second electrical control means including a single speed resolver having a rotor angularly positioned by the output shaft and a predetermined number of poles, the rotor of the single speed resolver being angularly positioned by the output shaft driven by said electric motor for effecting a plurality of electrical follow-up signals of variable phase and magnitude dependent upon the angular position of the rotor of the single speed resolver, means for applying the plurality of electrical follow up signals to the multi-speed resolver to so control energization thereof as to effect the phase and magnitude of the electrical output signal effected by the multi-speed resolver and thereby the angular position of the output shaft driven by the electric motor to effect the aforesaid control function, the multi-speed resolver of the first electrical control means including a number of poles equivalent to a multiple of the number of poles of the single speed resolver of the second electrical control means, the angular movement of the rotor of the single speed resolver of the second electrical control means required to null the signal at the electrical output of the multi-speed resolver of the first electrical control means being dependent upon the ratio of the number of poles of the multi-speed resolver of the first electrical control means to the number of poles of the single speed resolver of the second electrical control means so that the angular position of the rotor of the single speed resolver effected by the output shaft driven by the electric motor may in effecting the foregoing control function provide an electromechanical amplification of the limited arcuate angular movement imparted to the rotor of the multi-speed resolver in response to changes in the atmospheric pressure applied to said control device.

8. The combination defined by claim 7 in which the first electrical control means includes the multi-speed resolver having a pair of two phase input windings, a single phase output winding inductively coupled to the input windings, and the atmospheric pressure responsive control device being operably connected so as to angularly position the rotor of the multi-speed resolver and thereby the output winding relative to the input windings; the second electrical control means includes the single speed resolver having a pair of two phase output windings, a single phase input winding energized from the source of alternate current and inductively coupled to the pair of two phase output windings, and the output shaft driven by the electric motor being operably connected so as to angularly position the input winding of the single speed resolver relative to the output windings of the single speed resolver; one of the pair of two phase output windings of the single speed resolver of the second electrical control means being connected to an energizing circuit for one of the pair of two phase input windings of the multi-speed resolver of the first electrical control means, and the other of the pair of two phase output windings of the single speed resolver of the second electrical control means being connected in an energizing circuit for the other of the pair of two phase input windings of the multi-speed resolver of the first electrical control means.

9. The combination defined by claim 8 including variable means for applying the alternating current from the source to the input winding of the single speed resolver of the second electrical means so as to effect a correction in the angular position of the output shaft driven by the electric motor.

10. The combination defined by claim 9 in which the single speed resolver includes a pair of two phase input windings inductively coupled to the pair of two phase output windings of the single speed resolver, one of the pair of two phase input windings being energized from a constant source of alternative current and the variable means applying the alternating current from the source to energize the other of the pair of two phase input windings of the single speed resolver, the output shaft driven by the electric motor being operably connected so as to angularly position the pair of two phase input windings of the single speed resolver relative to the output windings of the single speed resolver, and airspeed responsive means for operating the variable means for controlling the energization of said other input winding of the single speed resolver so as to effect a correction in the angular position of the output shaft driven by the electric motor in accordance with the prevailing airspeed of an aircraft carrying the atmospheric pressure responsive control device.

References Cited

UNITED STATES PATENTS

| | | |
|---|---|---|
| 2,525,636 | 10/1950 | Bedford et al. |
| 2,862,661 | 12/1958 | Goldman. |
| 2,872,112 | 2/1959 | Greenwood. |
| 3,165,682 | 1/1965 | Modrowsky et al. |

THOMAS E. LYNCH, Primary Examiner

U.S. Cl. X.R.

318—30